United States Patent [19]

Farcinade

[11] 4,174,015
[45] Nov. 13, 1979

[54] RESTRAINT SEVERING DEVICE

[76] Inventor: Michel Farcinade, Rue des delices, 19, Geneva, Switzerland

[21] Appl. No.: 883,754

[22] Filed: Mar. 6, 1978

[30] Foreign Application Priority Data

Mar. 7, 1977 [CH] Switzerland .......................... 2977/77

[51] Int. Cl.² ............................................ B60R 21/10
[52] U.S. Cl. .................................. 180/268; 244/151 B
[58] Field of Search ............. 180/82 C, 103 R, 103 A; 307/10 SB; 297/385; 280/744; 242/107.4 SB; 244/151, 152

[56] References Cited

U.S. PATENT DOCUMENTS

| 3,023,498 | 3/1962 | Temple | 244/151 B X |
| 3,168,158 | 2/1965 | Schoeffler | 180/82 C |
| 3,177,966 | 4/1965 | Schoeffler | 180/82 C |
| 3,215,220 | 11/1965 | Schoeffler | 180/82 C |
| 3,774,870 | 11/1973 | Sheffield | 244/151 B X |
| 3,840,988 | 10/1974 | Hoffman | 244/151 B X |
| 3,961,680 | 6/1976 | Miescher | 180/82 C |
| 4,081,052 | 3/1978 | Scharer | 180/82 C |

Primary Examiner—Trygve M. Blix
Assistant Examiner—Terrance L. Siemens
Attorney, Agent, or Firm—Griffin, Branigan & Butler

[57] ABSTRACT

This disclosure describes a device adapted to be mounted on a safety belt type of restraint in which a sheering means may be actuated by energy storing means, thereby to sever the restraint. The energy storing means may be set off by one or more detectors responsive to abnormal conditions such as fire or violent shock.

12 Claims, 2 Drawing Figures

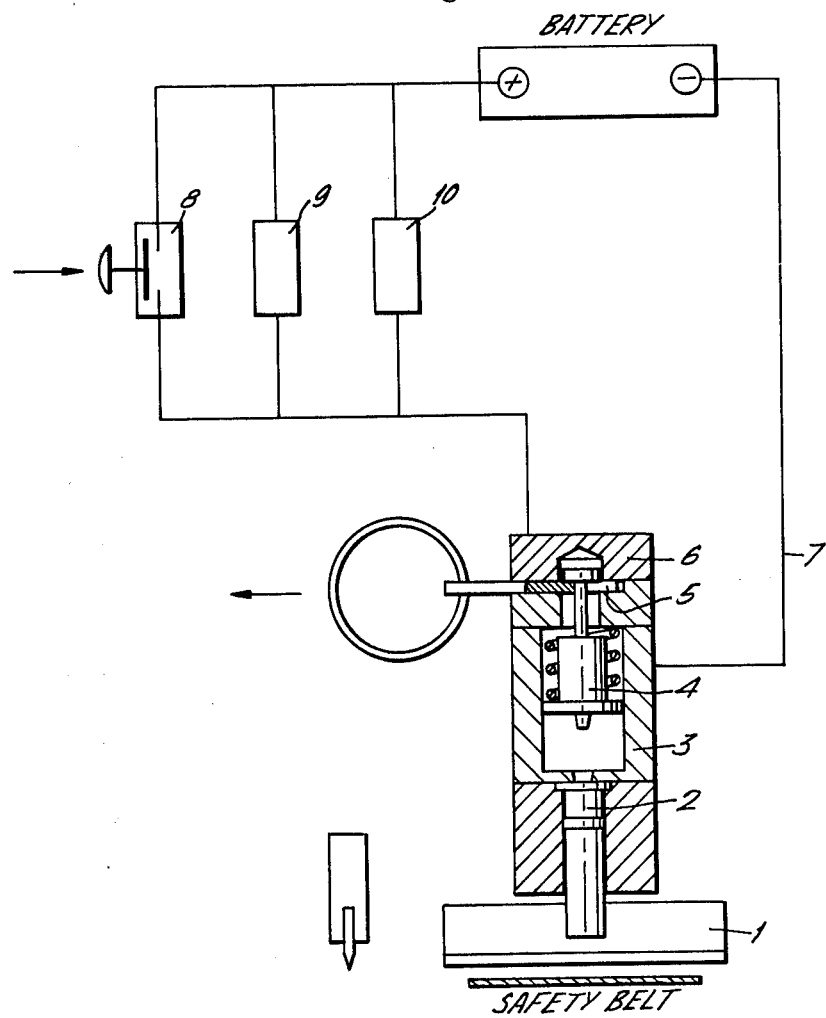

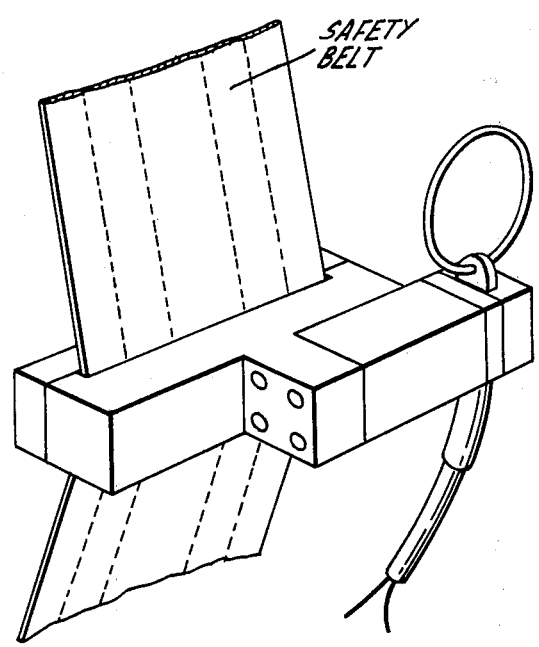

RESTRAINT SEVERING DEVICE

BACKGROUND OF THE INVENTION

This invention has for its purpose to enable the immediate liberation or in certain cases a delayed liberation of a physical restraint such as that provided by a band or a safety belt. In any event in which it becomes desirable or necessary to leave the place in which the restraint is normally utilized, there will be found a potential application for the device. Although such a device may find use in restraining means applicable to animals or inanimate objects within the interior or on the exterior of moving or static objects, an application which is immediately apparent is that of the well-known safety belt as found in automotive vehicles. For psychological reasons it would appear that often such safety belts are not used owing to the fear that following an accident the user would be unable to free himself. The present device is designed to act automatically to ensure that under certain accidental circumstances such as fire for instance, the restraining safety belt will be immediately severed. Under other circumstances such as shock following collision a certain delay will be imposed to enable the situation to return to normal thereby to avoid contact injury or violent ejection of the safety belt user from a moving vehicle.

Under certain situations it may likewise be desirable to provide for manual actuation of the device and means have also been provided to this effect.

SUMMARY OF THE INVENTION

The invention thus comprises a restraint severing device which includes shearing means, retaining means arranged to hold said shearing means in operative proximity to said restraint, energy storing means arranged so that release of the stored energy will effect operation of said shearing means and means to provide a triggering signal to said energy storing means including at least one sensing means adapted to sense an abnormal situation.

BRIEF DESCRIPTION OF THE DRAWINGS

FIG. 1 is a schematic view of an embodiment of the invention.

FIG. 2 is a perspective view of the embodiment as schematically shown in FIG. 1.

DETAILED DESCRIPTION OF THE INVENTION

In FIG. 1, 1 designates a shearing means in the form of a cutting blade. As will be realized from FIG. 2, such cutting blade 1 will be adapted to cut through a safety belt or similar restraint and to this end there is an anvil placed on the side of the restraint opposite that of the shearing blade 1.

Cutting blade 1 is attached to a piston mounted within a bore in a metallic retainer 3. The piston is arranged to be driven by an energy storing device which may for example comprise an explosive charge in the form of an ordinary blank cartridge 2. Within the bore in retaining block 3 there is further placed a striker 4 which may move towards the cartridge energy storing device 2 when propelled by a helical spring. In the inactive position the spring is held in a compressed state by a calibrated fuse wire attached to the striker and which is adapted to retain the spring in its compressed state between the striker and a shoulder within the bore.

A metallic cap member 6 is placed over the end of retainer 3 and between the cap member 6 and retainer 3 is a slot within which is a movable plate 5 provided with a central hole and notch. A ring is attached to the movable plate member 5 and serves as a manual release of the striker member 4. Thus by pulling on the ring, plate 5 is moved so that the hole therein opens the way to release of the retaining wire by permitting an enlarged end portion thereof to pass through said hole whereby the helical spring is released and propels the striker member 4 to detonate the cartridge 2 thereby forcing cutting blade 1 to sever the restraint.

In the event of serious accidents or fire, electrical means 8, 9 and 10 may be employed in which case instead of simply mechanically releasing the striker 4 such release is electrically effected by connecting a battery which may for instance be the automotive battery into a circuit which includes retainer 3, the fuse wire and the cap member 6. It will be realized that between these two metallic members an electrically insulating surface is provided whereby should a current from the battery be passed through the device this will pass through the retaining wire. The retaining wire as already mentioned is a calibrated fuse wire adapted to be melted by the battery current thereby releasing the spring and propelling the striker toward the cartridge 2.

Release device 8 is a manually activated arrangement such as a simple push-button switch. Release device 9 is a sensor adapted to act immediately in the case of a fire whereby the battery is immediately connected across the fuse wire.

Release device 10 is a shock or acceleration detector and is preferably provided with delay means, it being realized that in the case where this detector reacts, it will be preferable that such action be delayed. The purpose of a safety belt is to restrain the user in his range of movements during violent dynamic changes and thus prevent serious injuries owing to violent contacts with parts of the vehicle or in fact to be ejected therefrom. Thus it is foreseen that detector 10 will be provided with suitable delay circuits 11 designed so that the safety belt will be cut following a predetermined delay.

Other detectors could be equally employed where unusual situations might present themselves. Thus a fume detector might be provided. Other forms of energy storing means are imaginable and under certain conditions it is conceivable that the spring alone might be made sufficiently powerful to operate the cutting blade 1.

Finally, it is noted that the piston which actuates the cutting blade should be sufficiently tightly fitted to prevent escape of sparks or hot gases since otherwise there would be a risk of igniting any explosive vapours which might happen to be present.

I claim:

1. A restraint severing device which includes: shearing means, retaining means arranged to hold said shearing means in operative proximity to said restraint, energy storing means arranged so that release of the stored energy will effect operation of said shearing means to sever said restraint, and means to provide a triggering signal to said energy storing means including at least one sensing means adapted to sense an abnormal situation, said means to provide a triggering signal further including a striker means within a bore, a cocked spring means to propel said striker along said bore toward said energy storing means and thereby release said stored energy upon contact with said energy storage means, and a fusible wire for holding said spring means in its cocked position but for being severed in response to said sensing means sensing said abnormal situation to thereby release said spring to propel said striker.

2. A restraint severing device as in claim 1 wherein the energy storing means comprises a chemical motor.

3. A restraint severing device as in claim 2 wherein said chemical motor comprises a blank cartridge.

4. A restraint severing device as in claim 1 wherein said shearing means comprises a cutting blade and anvil means, said restraint being arranged to pass between said cutting blade and said anvil.

5. A restraint severing device as in claim 4 wherein said cutting blade is mounted on a piston adapted to be retained within a bore of the retaining means.

6. A restraint severing means as in claim 5 wherein said energy storing means includes a blank cartridge within said bore whereby said piston is forced outwardly upon firing said cartridge.

7. A restraint severing means as in claim 6 in which said sensing means, upon occurrence of an abnormal condition, connects a current source to said fusible wire thereby melting said wire.

8. A restraint severing means as in claim 7 in which said abnormal condition detecting means comprises a fire detector.

9. A restraint severing means as in claim 7 in which said abnormal condition detecting means comprises a shock or acceleration detector.

10. A restraint severing means as in claim 9 wherein said shock or acceleration detector includes a delay circuit.

11. A restraint severing means as in claim 8 wherein mechanically actuable release means is provided for said fusible wire.

12. A restraint severing means as in claim 1 wherein said restraint comprises a vehicle safety belt.

* * * * *